United States Patent [19]

Janssen et al.

[11] Patent Number: 4,468,154
[45] Date of Patent: Aug. 28, 1984

[54] METHOD OF DISPOSAL OR TEMPORARY STORAGE OF WASTE MATERIAL

[75] Inventors: Klaüs Janssen, Goslar; Jürgen Meier; Siegfried Frank, both of Bad Grund, all of Fed. Rep. of Germany

[73] Assignee: Preussag Aktiengesellschaft Metall, Goslar, Fed. Rep. of Germany

[21] Appl. No.: 321,203

[22] Filed: Nov. 13, 1981

Related U.S. Application Data

[63] Continuation of Ser. No. 189,358, Sep. 22, 1980, abandoned.

[30] Foreign Application Priority Data

Sep. 27, 1979 [DE] Fed. Rep. of Germany ....... 2939051

[51] Int. Cl.³ .......................................... E21F 15/08
[52] U.S. Cl. ................................... 405/128; 405/258
[58] Field of Search ............. 405/128, 129, 267, 258, 405/263; 299/11, 12, 18

[56] References Cited

U.S. PATENT DOCUMENTS

| | | | |
|---|---|---|---|
| 3,379,013 | 4/1968 | Slagle et al. | 405/128 |
| 3,459,003 | 8/1969 | O'Neal | 405/128 |
| 3,852,967 | 12/1974 | Stewart et al. | 405/128 |
| 3,978,673 | 9/1976 | Schleede | 405/128 |

*Primary Examiner*—David H. Corbin
*Attorney, Agent, or Firm*—Toren, McGeady and Stanger

[57] ABSTRACT

A method of disposal or temporary storage of fine particulate solid waste material or a mixture of such solid material with liquid including pumping the solid material entrained in liquid through a pipeline by means of a piston pump into a natural or artificial dump space above ground or below ground. To pump fine grained waste materials, for example dusty or paste-like and sludge-like waste materials, without incurring problems regarding the entrainment liquid and to prevent, in the case of underground storage, the production of a geologically insufficiently stable packing in a natural or artificial cavity, a high-consistency mixture containing less than 20% by weight of liquid, which is generally water, is pumped into the space by means of the piston pump.

10 Claims, 6 Drawing Figures

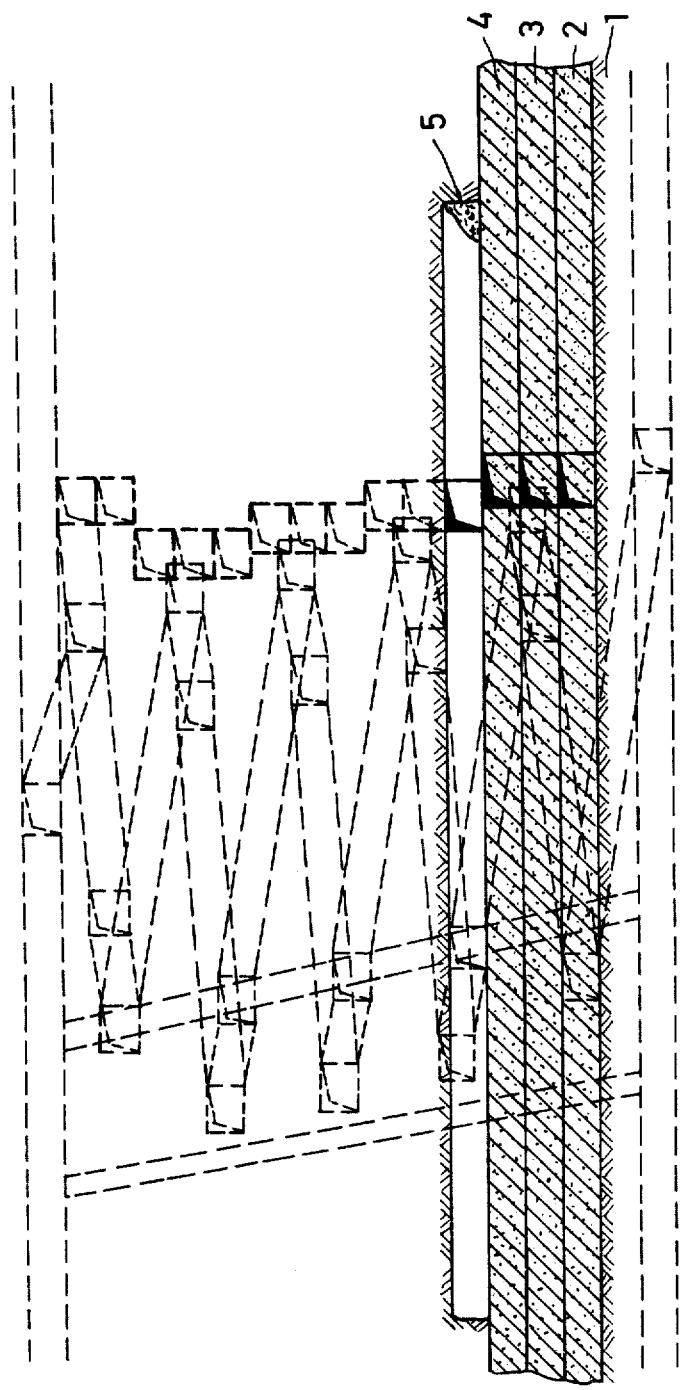

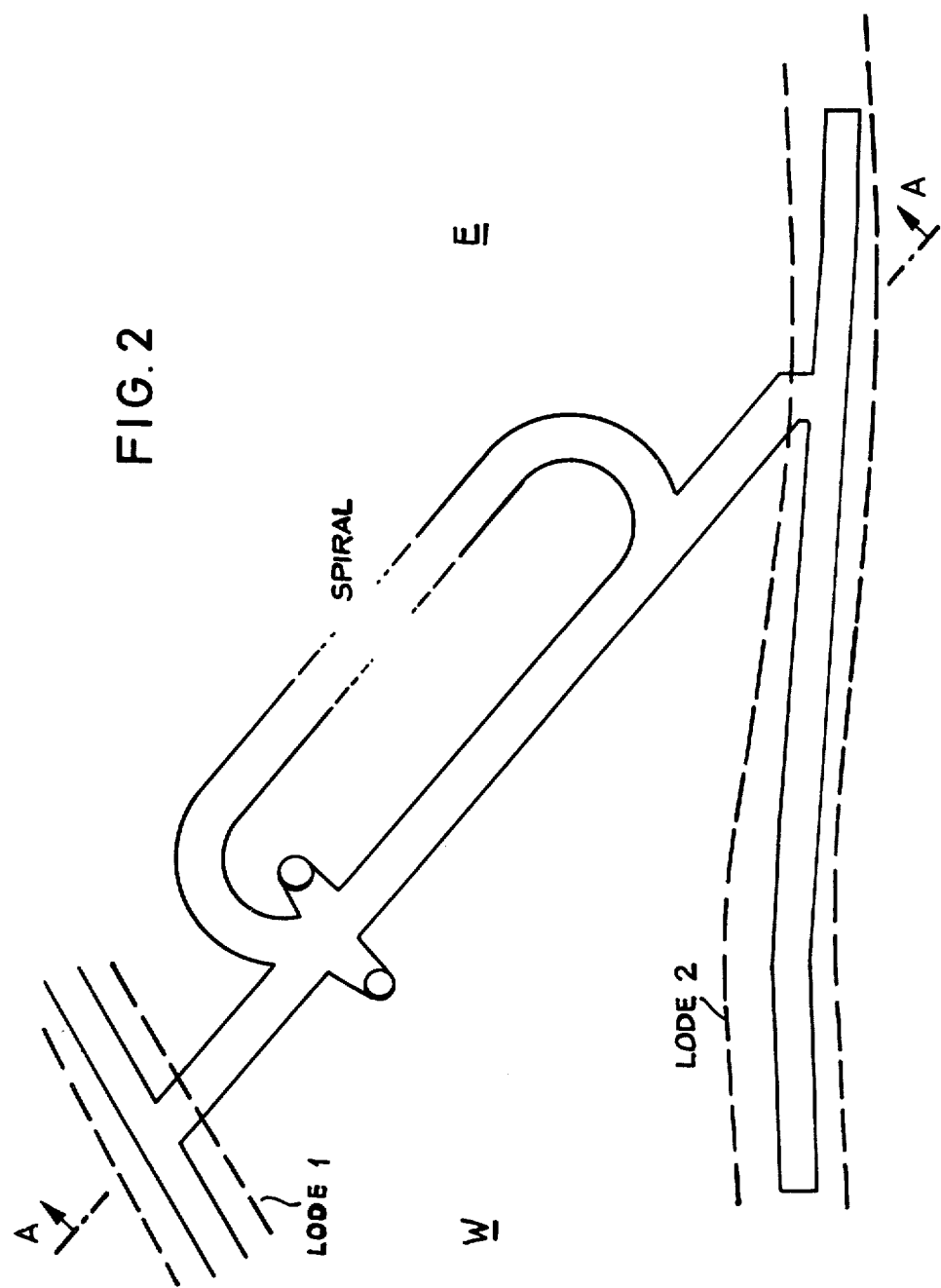

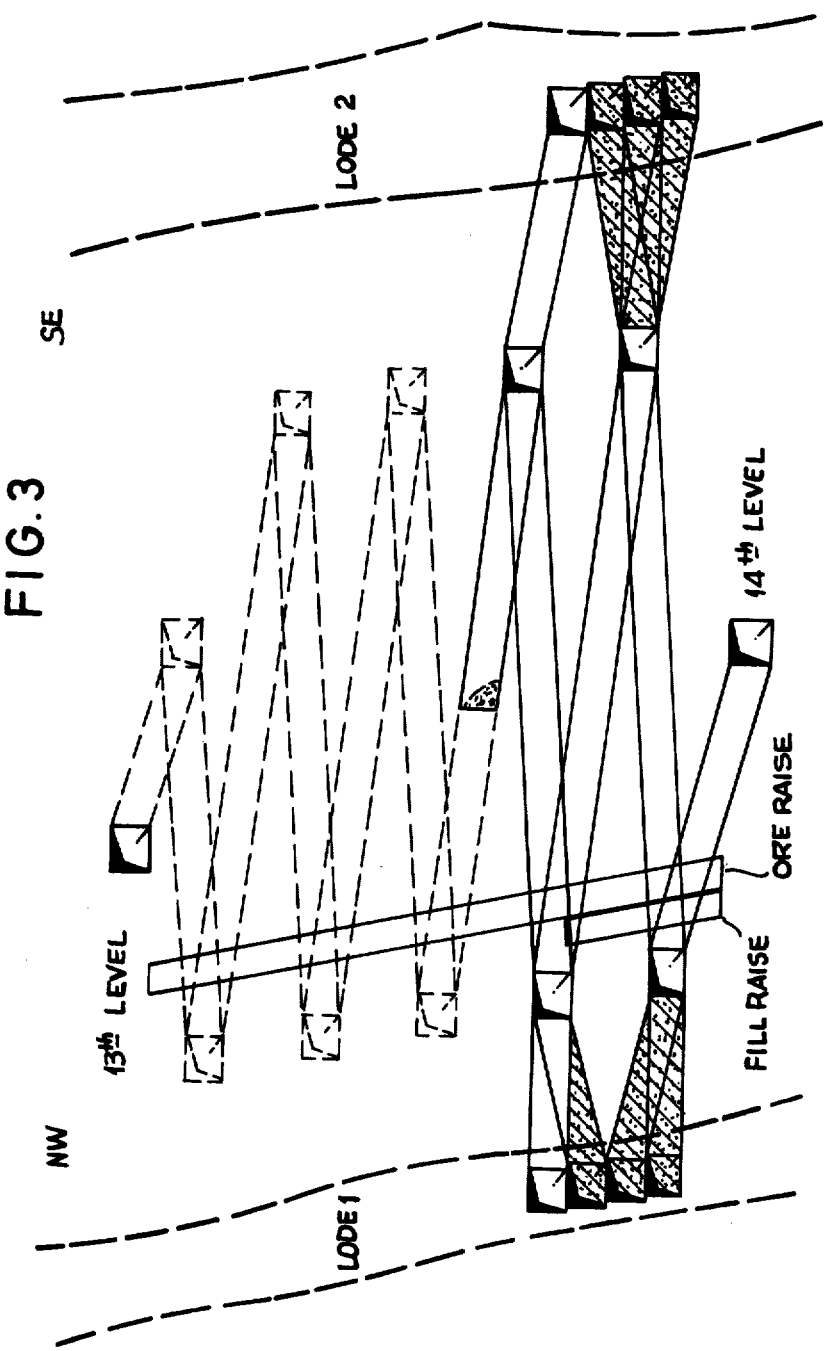

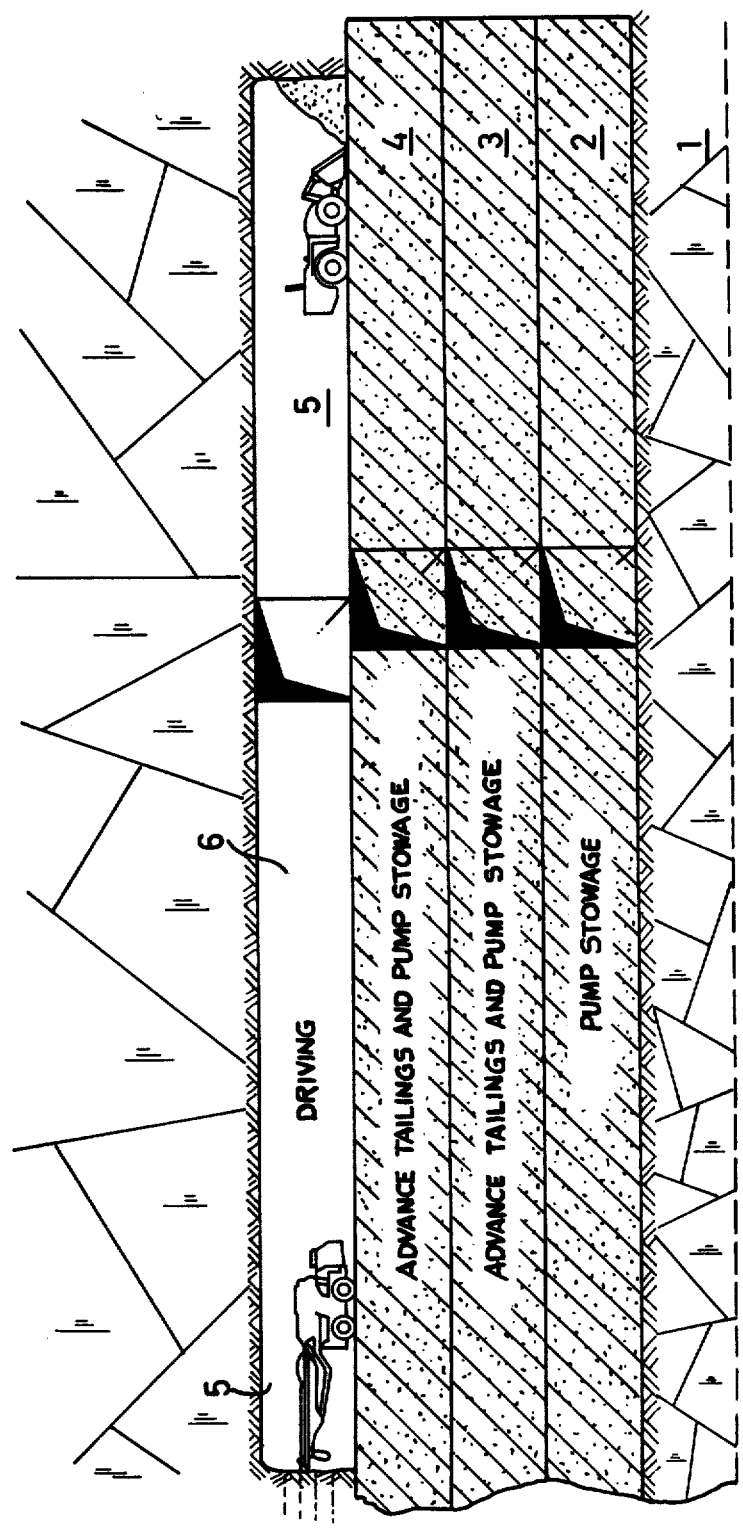

1 CRITICAL MIXTURE, Σ PORE VOLUME = SILT + WATER
2 OVERSATURATED, PUMPABLE MIXTURE
   Σ PORE VOLUME < Σ SILT + WATER

METHOD OF DISPOSAL OR TEMPORARY STORAGE OF WASTE MATERIAL

This is a continuation of Ser. No. 189,358 filed Sept. 22, 1980, now abandoned.

This invention relates to methods of disposal or temporary storage of fine particulate solid waste material or a mixture of fine particulate and liquid waste material. In the method, particulate solid waste material is entrained in a liquid and is pumped through a pipeline into a natural or artificial, above-ground or under-ground, dump or chamber and the solid material is deposited therein.

At the present time, waste disposal is a problem of increasing significance, especially in terms of cost and safety. So also is the filling of above-ground or under-ground dumps and cavities which becomes necessary for agricultural or mining reasons. This applies in particular to the disposal of environmentally dangerous substances which have to be removed from the biological cycle and must therefore generally be reliably deposited in under-ground geological formations where they will remain without maintenance for a long period which may be as long as a century or more.

In under-ground mining it is customary to use waste rock or other filling materials to fill cavities produced by the mining of minerals. Furthermore, the degree to which mined material is diluted by waste or dead rock yielded in different working procedures can be reduced only by using filling material so that a higher grade starting material is made available for processing. The tailings of the mined material can be used as goaf for filling or stowing. Available tailings are however suitable as goaf for stowing only to a certain extent, that is to the extent to which tailings are in the form of coarse particulate light rock, so that only a small proportion of wanted mineral stock can be worked using this kind of stowing.

Suitable stowing methods comprise flushing and pneumatic packing. Both methods are at present substantially mechanized but suffer from the economic disadvantage of repeated interruptions in conveyance over the distance from the location at which the particulate light ground tailings or other particulate waste material occurs where ore is dressed on the surface to the location where it is used for filling near the working face of a mine. Furthermore, in the flushing process, the goaf is conveyed substantially only by utilizing gravitational force but usually this is not sufficient so that some pressurized water and/or pneumatic conveying means has to be used as well. Pneumatic packing on the other hand consumes large amounts of energy and leads to a high degree of dust nuisance and severe wear of the conveying devices. Slumping on the other hand calls for a relatively tall working face space where the filling is deposited and this causes substantial ore dilution if the dead rock is very friable.

Leaching and flotation tailings have so far been found unsuitable as goaf for stowing, owing to their fine granular nature, since they are introduced into the mine with a high proportion of water and and do not dewater at the face when the flushing process is used, which is suitable for fine sand. Tailings of this kind are therefore deposited in settling ponds, which are known as tailings dams, a procedure which is practiced world-wide but is environmentally detrimental and costly.

In the known flushing process, the goaf is conveyed by means of water through pipelines into the working face space of the mine which is to be packed. Fine particulate goaf such as sand, washable fly ash and granulated blast furnace slag with the least possible proportion of fine granulated material is used to this end. Depending on the nature of the goaf, the ratio of goaf to entrainment water is usually from 1:1 to 1:5. This substantial quantities of water which thus enter the working face space that is to be packed give rise to a number of problems. Firstly, filling having adequate load bearing capacity is obtained only if the goaf is adequately dewatered. Secondly, the flushing water must be removed from the working face space and must be cleaned for example in settling tanks. This involves substantial costs. Liquid or solid environmentally dangerous waste material cannot be conveyed by the flushing process at all, either because the flushing liquid is initially contaminated or it is contaiminated by environmentally dangerous solid material. Another disadvantage of the flushing method is that the pipelines are subjected to a high rate of wear in relation to the quantity of goaf or solids conveyed thereby.

Finally, exceptionally costly storage in tanks is frequently the only method which can be used for storage or disposal of harmful liquid substances.

It is therefore the object of the invention to provide a method by which fine grained particulate waste materials, for example dusty waste materials, and also paste-like and sludge waste materials can be disposed of or temporarily stored without giving rise to problems regarding the entrainment liquid or without resulting in geologically insufficient stable storage in a natural or artificial cavity in the case of under-ground storage.

According to this invention we provide a method of disposal or temporary storage of fine particulate solid waste material or a mixture of solid and liquid waste material, wherein the solid waste material is entrained in a liquid to form a mixture containing less than 20% by weight of entrainment liquid and the mixture is pumped by means of a piston pump through a pipeline into a natural or artificial, above-ground or under-ground dump or chamber.

The small quantity of liquid, which is advantageously from 12% to 15% by weight of the mixture but can even be less than 10% by weight, results in a high consistency material suitable for pumping and therefore leads to a kind of high-viscosity thrust-pumping in the form of a quasi laminar flow with a uniform flow velocity over the pipe cross-section. The flow velocity, which is low in terms of unit solids volume compared with the low-viscosity pumping of the flushing process, requires less energy and, because of the lower specific friction, results in substantially reduced pipe wear. Furthermore, the relatively small quantity of entrainment water obviates, where the mixture is used for packing, the need for dewatering at the face of from the working face space which is being packed without incurring the risk of polluting the ground water at the face. This is a particular advantage if instead of water the liquid contains an environmentally dangerous liquid.

On the other hand, the small quantity of liquid also permits the mixture to be bound at the face, for example by hydraulic binding of the mixture with cement, without the costs of the hydraulic binding agent exceeding a tolerable amount.

The method in accordance with the invention is therefore ideally suited for waste disposal or temporary waste storage where subsequent further processing is envisaged, especially storage of waste material from chemical or physical separation processes, for example leaching, precipitation and flotation, water purification and clarification as well as waste materials relating to ash, filter sludge and fine-grained screened material. The particular advantage in the disposal of environmentally dangerous waste material relates not only to the small quantity of entrainment liquid but to the pipeline conveying system which can be formed as a closed system between the infeed location and the disposal location and thus precludes any form of leakage.

The method in accordance with the invention permits the ordered storage, without harmful hydro-geological consequences of solid as well as of paste-like or other liquid-containing waste materials. Paste-like or solid waste materials need merely be adjusted to the water or other liquid content required for the high-viscosity thrust pumping operation using a piston pump. The liquid content of the mixture can be another waste material which is liquid, including toxic waste liquids. It is possible, by the addition of solid particulate material for liquid waste substances to be converted into a mixture suitable for permanent storage.

This meets the general requirement as far as possible not to dilute dangerous waste substances but to dump harmful substances in the most concentrated possible form and therefore in relatively small quantities.

The method in accordance with the invention is based on the principle that the minimum quantity of entrainment liquid required for pumping diminishes with an increase in the coarse particulate proportion of the mixture. The reason for this is due to the decrease in specific surface area which diminishes with increasing particle size. At the same time, an increasing proportion of coarse particulate material also increases the viscosity of the pumped mixture and in this way counteracts any separation tendency in the pumping direction. However, advantageously the size of the largest individual particle should be from 15% to 20% of the diameter of the pumping pipeline. Furthermore, the amount of coarse particulate material required diminishes with a decrease in the pipeline diameter. Small pipeline diameters are therefore preferred for the disposal of fine particulate waste substances.

Advantageously, the mixture contains finer grained material and coarser grained material which satisfies the following condition:

$$\frac{\dot{V}_F + \dot{V}_{Fl}}{\dot{M}_G} > \frac{1}{\gamma'G} - \frac{1}{\gamma G},$$

where
$\dot{V}_F$ is the volumetric flow rate of the finer particulate material (m$^3$/h);
$\dot{V}_{Fl}$ is the volumetric flow rate of the total liquid content of the mixture (m$^3$/h);
$\dot{M}_G$ is the mass flow rate of the coarser particulate material (t/h);
$\gamma'_G$ is the bulk density of the coarser particulate material (t/m$^3$); and
$\gamma_G$ is the density of the coarser particulate material (t/m$^3$).

In simplified form, a pumpable mixture can be characterised by the expression $$\dot{M}_F + \dot{M}_{H2O} > \dot{M}_G$$

or it can be expressed by $$\dot{M}_F > \dot{M}_G$$

in the circumstances that the method is to function with the least possible water content of the mixture. In the above expressions
$\dot{M}_F$ is the flow rate of the fine particulate material (t/h); and,
$\dot{M}_{H2O}$ is the flow rate of the total water content of the mixture (t/h).

The method in accordance with the invention can be used with particular advantage when making use of light ground tailings and flotation tailings as goaf for stowage under ground. This results in a method for packing under-ground cavities where suitable starting materials are available in adequate quantities, so that the entire operation, for example in an ore mine, can be carried out by stowing with goaf. In contrast to blind level caving and blind level working with stowage, working the mine face with pump stowage calls for opening only of a relatively small working cavity necessary for winning the ore, thus preventing the collapse of friable rock during the winning operation and at the same time preventing any dilution of the ore.

It is desirable to mix light ground tailings and flotation tailings at the rate at which they are produced. In particular, light ground tailings and flotation tailings can be mixed with each other in substantially equal parts.

Mine tailings, which are so called light ground tailings gravel with a particle size of from 3 to 30 mm and flotation tailings, which is an exceptionally fine grained material with a particle size of less than 0.5 mm, may be mixed with each other and, given a water content of approximately 12% to 15% by weight, form a pumpable material. Advantageously, the mixture is pumped by means of twin piston pumps as far as the working face or other place where the material is to be dumped. Distances of several kilometers can be covered by using intermediate pumping stations. At the face, the water contained in the mixture can be bound by means of cement which is added to the mixture, for example at the face. The lean concrete produced by the binding operation has excellent supporting properties similar to those of a consolidated stowing goaf.

It is desirable to add as little water as necessary to the mixture, comprising light ground tailings and flotation tailings to ensure that the amount of cement required for binding the water at the face does not exceed the amount required for a lean concrete goaf. A high proportion of water would merely stress the conveying system and lead to difficulties when the goaf is packed at the working face.

In a preferred method, flotation tailings are first separated in an ore dressing station at a particle size off 0.06 mm, subsequently the portion of the flotation tailings with a particle size in excess of 0.06 mm is dewatered by means of a cyclone and a dewatering screen and the portion of the flotation tailings with a particle diameter of less than 0.06 mm is dewatered by means of a thickener and a centrifuge. The dewatered flotation tailings are then adjusted by the addition of light ground tailings to a specific water content and thereafter the mixture is pumped into a mine and at the face it is mixed with cement. In this operation the mixture is pumped at a pressure of about 100 bar.

The goaf load bearing capacity of, for example, 20 bar with 3% by weight of cement, similar to that of a lean concrete, also contributes so that the workingstowing process combination made possible by the introduction of pump stowage, provides optimum conditions to control even particularly difficult rock conditions. Furthermore, the risk of rock fall is reduced, thus leading to improved working safety. The costs of working can also be substantially lowered because of the reduced expenditure for mine supports.

In terms of conveying technique, the means for conveying the goaf continuously from the location at which the goaf is produced in the dressing station above ground, to the location where it is stowed at the face in the mine represents an optimum. Another advantage in the use of flotation tailings for the goaf is that the tailings need no longer be dumped on tips above ground.

Compared with conventional processes which convey the goaf only in substantial dilution by means of an entrainment fluid which is compressed air in the case of pneumatic packing and water in the case of flushing, conveying the high-consistency mixture by pumping in accordance with the invention takes the form of hydraulic high-viscosity pumping, with little entrainment liquid, disregarding the small addition of water which is in any case required to bind the cement at the face.

The absence of any substantial quantity of entrainment liquid, which has to be separated again at the face, represents a substantial advantage for pumped stowage. The method avoids the dust nuisance at the face resulting from pneumatic packing or the sludge and water problems which results from the use of flushing. The substantially reduced rate at which the goaf mixture is pumped results from the reduction in entrainment liquid and this in turn leads to substantially reduced pipeline wear when compared with the previously-mentioned methods.

The degree of pumpability of the mixture depends on the presence of particles of medium or fine grained size in volumetric proportions which exceed the volumetric proportion of the theorectical pore volume of coarse particulate material in the mixture. Continuous sliding of the material in the pumping pipeline is possible only if larger particles cannot form bridges across the pipeline cross-section and so jam. This calls for a specific proportion of finer material to separate the coarser particles from each other in the mixture. Such a particle size spectrum and the high consistency of the mixture substantially prevent any relative motion between individual particles, so that these are fixed in their relative positions during pumping and there is no risk of segregation. Very fine grained particles play a particularly important part in terms of pumpability and wear caused by the entrainment liquid and these very fine particles have the additional function of producing a sliding film between the high-consistency pumped material and the pipeline wall. The said sliding film or antifriction film is produced by way of pressure demixing due to the proportion of water in the mixture.

An example of a method in accordance with the invention will now be described with reference to the accompanying diagrammatic drawings in which:

FIG. 1 is a side elevation of mine faces;

FIG. 2 is a plan view of part of the mine;

FIG. 3 is a section along the line A—A of FIG. 2;

FIG. 4 is an enlarged view of regions A and B of FIG. 1;

FIGS. 1 and 4 show that faces 2, 3 and 4 on the main face 1, which forms the floor slope, have been worked and are packed with goaf. Ore is still being obtained from a face 5. On completion of the ore winning operation, the face 5 is also packed with goaf. Cavities 6 are kept comparatively small, more particularly any two superjacent blind levels in the face region do not communicate with each other to form a large cavity which would give rise to difficulties in terms of controlling its support.

The table I below is a screen analysis of light ground tailings of an ore mine while Table II shows the screening analysis of flotation tailings of the same mine. The Tables show that the flotation tailings have a particle size of 0.5 mm or less while the light ground tailings have a particle size of 3 mm or more.

TABLE I

| Particle size range mm | % by weight | % by weight (cumulative) |
|---|---|---|
| +30 | 1.8 | 1.8 |
| 20 | 20.4 | 22.2 |
| 15 | 24.2 | 46.4 |
| 10 | 24.6 | 71.0 |
| 5 | 21.8 | 92.8 |
| 3 | 3.5 | 96.3 |
| −3 | 3.7 | 100.0 |

TABLE II

| Particle size range mm | % by weight | % by weight (cumulative) |
|---|---|---|
| +0.5 | 1.5 | 1.5 |
| 0.315 | 6.5 | 8.0 |
| 0.2 | 10.8 | 18.8 |
| 0.16 | 13.7 | 32.5 |
| 0.1 | 7.2 | 39.7 |
| 0.08 | 11.8 | 51.5 |
| 0.063 | 4.9 | 56.4 |
| 0.04 | 7.0 | 63.4 |
| −0.04 | 36.6 | 100.0 |

Figure 6:
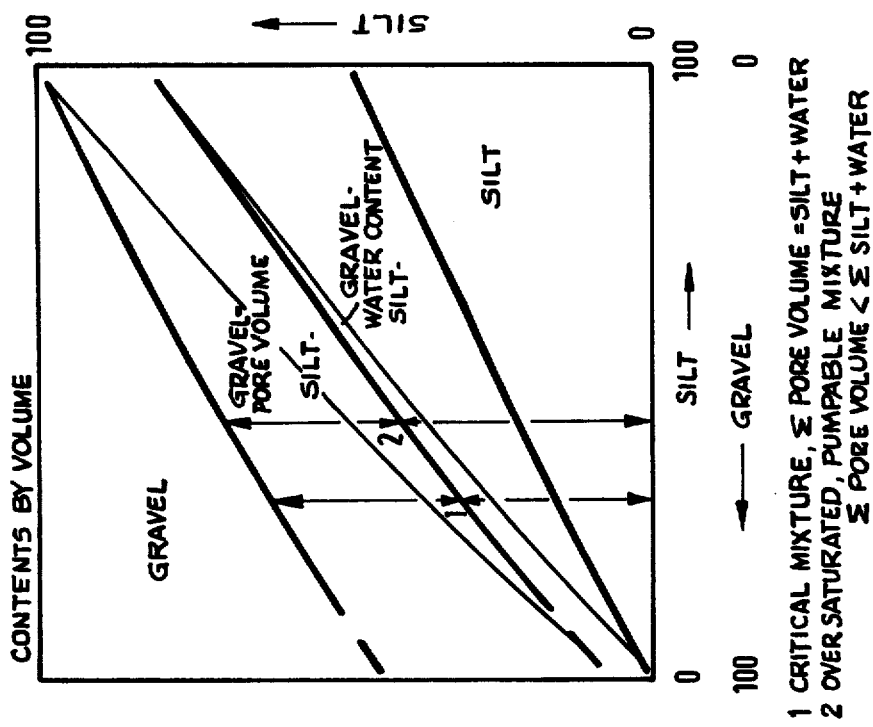
Figure 5:
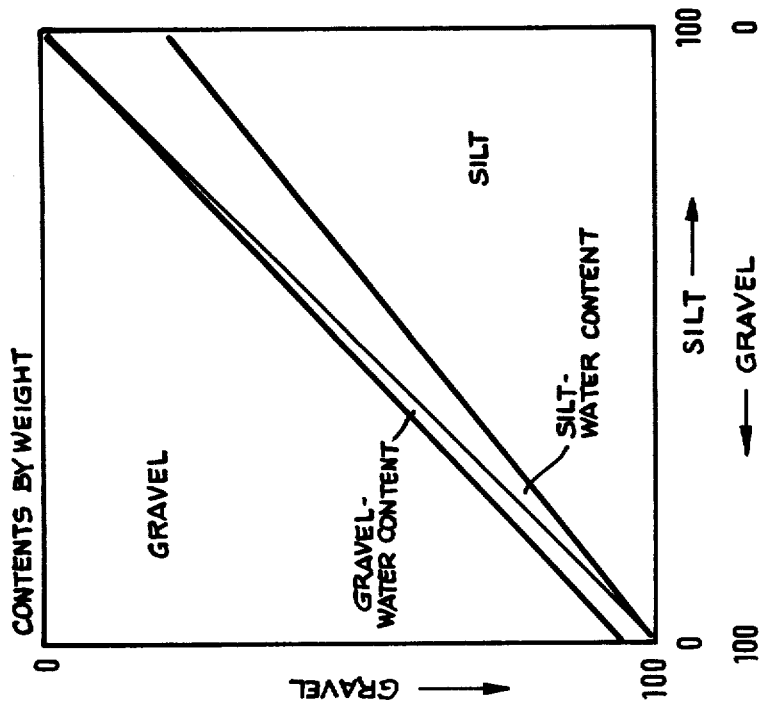
FIG. 5 is a graph showing the proportion of water and degree of saturation of the pore volume in dependence on the ratio of gravel to poor clay in proportion by weight; and, FIG. 6 shows the conditions illustrated in FIG. 5 but in this case in volumetric proportions.

FIGS. 5 and 6 show the water proportion of the goaf mixture in dependence on the mixture ratio of coarser material with flotation tailings. The high proportion of fine-grained material precludes dewatering of the goaf at the face, which would otherwise call for the addition of a hydraulic binder. For this reason, the water content of the mixture represents another criterion which defines the efficiency of the process. It would of course be possible to ensure pumpability by providing an excess of flotation tailings in the mixture. However, the water content of this mixture component after dewatering is several times greater than that of the coarser material (water content of the light ground tailings approximately 5% by weight and water content of the flotation tailings approximately 25% by weight) so that this would call for an unnecessarily high cement consumption for binding the water.

Tests have shown that the following principle applies to the make-up of a high-consistency pumpable mixture, of material containing gravel as well as substances with a grain size varying from fine sand to poor clay, with the least possible water content: The sum of the pore volumes of the mixture components—which can be approximately calculated from the quotient of their bulk density and their specific density—should be exceeded by the sum of the slip grain proportion and of the water content (see FIGS. 5 and 6). Slip grain refers to the fine-grained fraction capable of filling the pore spaces of the gravel particles. This make-up formula is subject to the following conditions.

Pure gravel as a solid which is to be pumped calls for a higher water content in the mixture than would correspond to its pore volume (minimum 40% for light ground tailings) and substantial excess water would be necessary owing to the risk of segregation with the consequence of line blockage, thus resulting in pumping of low-viscosity material.

Pure flotation tailings need not be considered, since the generally recognized critical value for the pipeline diameter of 4 to 6 times the maximum particle size is so far exceeded for the pipeline diameter which must be used to obtain the required throughput, and the risk of blockage occurring even with low water contents therefore no longer exists.

In a mixture comprising gravel and poor clay, the proportion of poor clay functions as slip particles in terms of the pore dimensions of the gravel, so that the lowest theoretical water requirement of the mixture is obtained if the proportion of poor clay just corresponds to the pore volume of the gravel particles and only the pore volume of the poor clay proportion has to be filled with water.

The goaf which preferably consists of light ground tailings and flotation tailings, is advantageously prepared at the dressing station and is pumped into the mine from a pumping station above ground. This offers the advantage of an uninterrupted conveying path and it also provides a substantial energy-saving effect if the gain of head due to the pipeline down the mine shaft is utilized in order to overcome resistance to flow in horizontal parts of the pipe underground.

The advantages of the pumped stowage method in accordance with the invention compared with known methods, in particular flushing, apply to all mining operations. Reasons advocating the use of this method can be considerations of mining technology as well as the need for controlling high rock pressure, for example in South Africa, the absence of material suitable for flushing, difficulties in removing flushing water or the effect thereof on the rock or other difficulties in dumping flotation tailings.

It is undoubtedly an advantage to pump particulate waste material in high-consistency form, so that the need for removing entrainment water at the dumping location or at the place of further processing after temporary storage is substantially obviated. Another field of use is in the pumping of heterogeneous particulate waste material, such as municipal sewage, sludge and crushed garbage or fine ash with lumpy slag, each mixed in an optimum proportion in accordance with its pore volume.

The method in accordance with the invention also makes it possible to dispose of harmful or dangerous waste material without physical contact in an initially liquid embedment substance which can be pumped. Metered, free mixing of the harmful substance with the embedment substance as well as proportional adding to the pumped stream of material is possible. The purpose of such pumping can be either confined to transportation without physical contact or to permit permanently safe dumping in a concrete like embedment substance.

We claim:

1. A method of transporting and dumping waste material consisting of finer grained and coarser grained particulate solid material, said method comprising the steps of: forming a mixture of said particulate material and a liquid having said particulate material entrained therein wherein the amount of said liquid consists essentially of less than 20% by weight of said mixture, wherein said finer grained material is present in said mixture in a volumetric proportion which is at least equal to the volumetric proportion of the theoretical pore volume of said coarser grained material, and wherein the pore volume of said finer grained material is filled with said liquid; pumping said mixture by means of a piston pump through a pipeline; and discharging said mixture into a dumping space.

2. A method as claimed in claim 1, in which said mixture contains from 12% to 15% by weight of said liquid.

3. A method as claimed in claim 1, in which, said finer grained material and said coarser grained material satisfy the condition:

$$\frac{\dot{V}_F + \dot{V}_{Fl}}{\dot{M}_G} > \frac{1}{\gamma'_G} - \frac{1}{\gamma_G},$$

where
$\dot{V}_F$ is the volumetric flow rate of the finer particulate material (m$^3$/h);
$\dot{V}_{Fl}$ is the volumetric flow rate of the total liquid content of the mixture (m$^3$/h);
$\dot{M}_G$ is the mass flow rate of the coarser particulate material (t/h);
$\gamma'_G$ is the bulk density of the coarser particulate material (t/m$^3$); and
$\gamma_G$ is the density of the coarser particulate material (t/m$^3$).

4. A method according to claim 2, 3 or 1, in which the sum of volumes of slip grain proportion of the particulate material and the liquid is greater than the sum of the pore volumes of the whole of the particulate material.

5. A method according to claim 1 in which the size of the largest individual particle is from 15% to 20% of the diameter of the pipeline.

6. A method according to claim 1 wherein the mixture is bound at the place to which it is pumped.

7. A method according to claim 6, in which the mixture is hydraulically bound.

8. A method according to claim 6 or claim 7, in which cement or other binding agent is added to the mixture.

9. A method according to claim 1 wherein the solid waste material in the mixture comprises light ground and flotation tailings.

10. A method according to claim 9, in which the light ground and the flotation tailings are mixed with each other in substantially equal proportions.

* * * * *